Feb. 6, 1934. H. HUEBER ET AL 1,946,074
RADIATOR SHELL
Filed Oct. 2, 1931   2 Sheets-Sheet 1
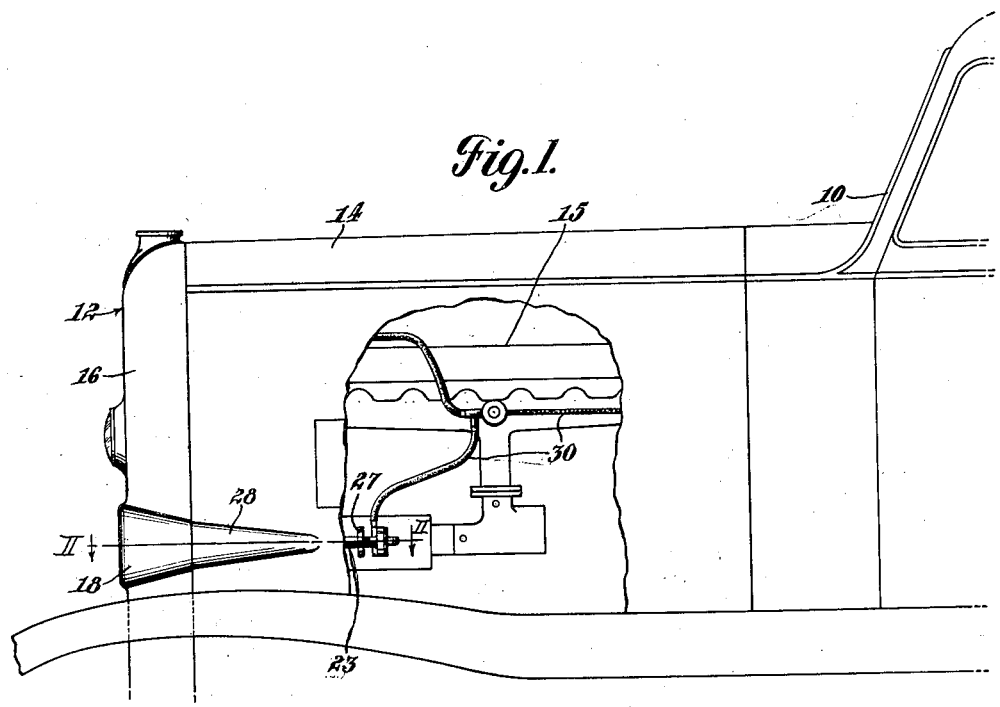
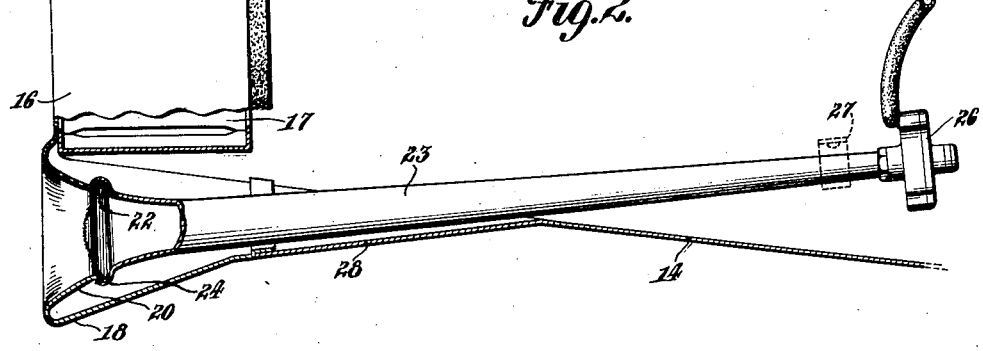
Henry Hueber,
Erwin C. Horton,
INVENTORS

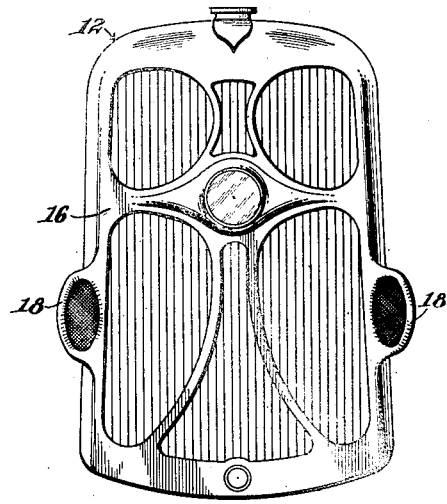
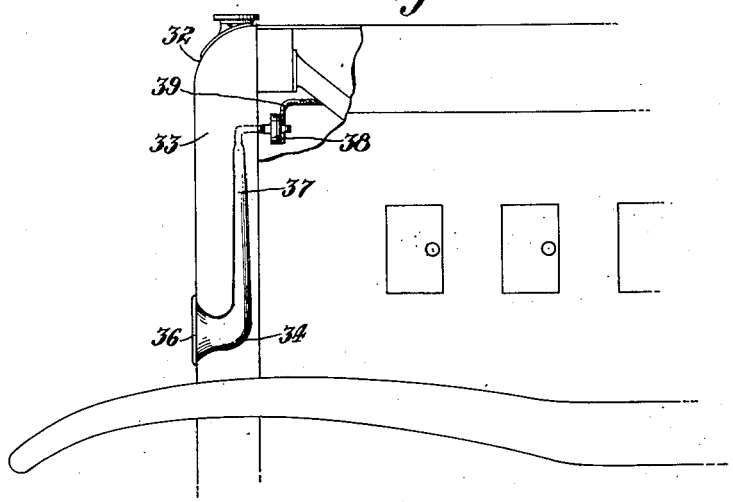

Patented Feb. 6, 1934

1,946,074

UNITED STATES PATENT OFFICE 1,946,074

RADIATOR SHELL

Henry Hueber, Buffalo, and Erwin C. Horton, Hamburg, N. Y., assignors to Trico Products Corporation, Buffalo, N. Y.

Application October 2, 1931. Serial No. 566,574

12 Claims. (Cl. 180—54)

This invention relates to radiators for motor vehicles, and it has particular relation to the outer shell construction of such radiators and the installation of horns therein.

In applying signalling devices, such as horns, to motor vehicles it has been customary to mount them either in full view outside the stream line contour of the vehicle structure, or they have been concealed underneath the vehicle hood. The tendency in modern body design for vehicles is toward maintaining the stream lining with as little interruption as possible. However, the horn mounted upon the outside of the stream line contour of the vehicle marred the design, as well as offering considerable wind resistance. Moreover, complications in design are encountered in attempting to coordinate the stream lining with the horn construction. On the other hand there is a limited space underneath the hood for mounting horns and since this location is enclosed the advantages of sounding the horn are considerably restricted because it must necessarily be somewhat muffled.

One of the principal features of the invention disclosed herein resides in a construction in which a horn and radiator are designed in such manner as to be harmonized from the standpoint of stream lining whereby the most efficient action of the horn is insured and at the same time the appearance of the vehicle is enhanced. Other features of the invention include special design of the hood of the motor vehicle to accommodate the horn without materially affecting the proper stream lining of the contour thereof. In this type of construction relatively long trumpet-like horns can be incorporated in conjunction with the radiator and hood and still present the sound of the horn directly in front of the vehicle without any obstruction.

For a better understanding of the invention reference may now be had to the accompanying drawings forming a part of this specification of which Fig. 1 is a fragmentary side elevation of a motor vehicle hood and radiator in which the invention has been incorporated;

Fig. 2 is a fragmentary cross section, on a larger scale, taken substantially along the line II—II of Fig. 1;

Fig. 3 is a front elevation of the radiator shown by Fig. 1; and

Fig. 4 is a fragmentary side elevation of a hood and radiator in which another form of the invention has been incorporated.

Referring to Figs. 1 to 3 a motor vehicle 10 is shown which comprises a radiator 12, a hood 14, and a motor 15 mounted in the vehicle. A radiator shell 16 surrounding a conventional radiator core 17 is provided with integral flared mouth portions 18 each of which is turned inwardly to form a flange 20 having a beaded portion 22 at the extremity thereof. From Fig. 3 it will be apparent that the mouth portions are symmetrically arranged and are designed to merge gracefully into the entire design of the radiator. A horn shank 23 having a beaded portion 24 at its end that cooperates in inter-fitting relation with the beaded portion 22 extends rearwardly underneath the hood to a sounding device 26 of the horn at the end opposite the beaded portion. In assembling the beaded portions 22 and 24 they may be snapped into engagement with each other and then brazed or welded permanently together. On the other hand these beaded portions are adapted to be detachably connected, and when they are designed for such connection, one of them is split in order that it may yield resiliently when the beaded portions are pressed into engagement with each other. Also, these beaded portions can be secured together by a shrinking process. Since the shank of the horn of this type is relatively slender it requires relatively small space and can be conveniently installed underneath the hood and the entire horn, including the mouth portion 18 and the shank 23 does not materially interfere with proper access to the motor for inspecting or repairing it when the hood is raised. A suitable bracket 27 can be connected to the free end portion of the horn shank and to the motor for the purpose of minimizing vibration of the horn incidental to the operation of the vehicle.

The front portion of the hood on each side of the vehicle has an outwardly bulged rib or corrugation 28 which provides a substantially continuous tapered stream lined contour from the mouth portion toward the rear of the vehicle. The shank of the horn is normally disposed in the bulged portion of the rib 28. When the hood is in its normal position the junction between the radiator and the hood follows the contour of the radiator shell including the contiguous portions of the horn mouth 18 and the rib 28. Thus the hood can be raised or lowered without interfering with this arrangement of the horn. Suitable controlling lines 30 communicate with the portion of the vehicle that is accessible to the driver and since this construction is conventional, a detailed description of it is not necessary for a proper understanding of this invention. Suffice it to say that the lines in this kind of arrangement are suitable for fluid pressure operation or electrical operation in transmitting energy for sounding the horn.

In the construction shown by Fig. 4 a radiator 32 having a shell 33 in which a horn 34 is installed is similar to the construction shown in the other figures. However, in this instance the entire horn, including its mouth portion 36 and its shank 37, is designed as a part of the shell and the shank extends upwardly to a sounding device 38 that is connected in the same manner as that described with reference to Figs. 1, 2 and 3. Suitable lines 39 corresponding to the lines 30 are provided with conventional controlling devices operated by the vehicle driver. The shank 37 projects outwardly in the form of a bead or corrugation along the side of the radiator shell. In all of these constructions the mouth portions of the horns are presented directly to the atmosphere at the front of the vehicle, and since considerable space is thus available for the horn shank the desired tone or tones in the horn can be selected to suit the individual taste.

Although only two forms of the invention have been shown and described in detail it will be apparent to those skilled in the art that the invention is not so limited but that various changes may be made therein without departing from the spirit of the invention or from the scope of the appended claims.

I claim:

1. The combination with a radiator shell for motor vehicles, of a signalling device having portions thereof formed integrally in the radiator shell, and a hood adjacent the radiator shell, said signalling device having like registering portions on the radiator shell and hood respectively to extend substantially continuously from the radiator shell into the hood.

2. The combination with a radiator for motor vehicles, of a signalling device having portions thereof symmetrically incorporated in the radiator, and a hood adjacent the radiator, portions of the signalling device extending symmetrically into the hood to form a substantially continuous contour of the signalling device from the radiator to the hood and broken only when the hood is raised.

3. The combination with a radiator for motor vehicles and a hood mounted adjacent the radiator, of a horn installation having portions incorporated in both the radiator and the hood, the contour of said portions being substantially continuous.

4. In a motor vehicle having a radiator, a hood, and a motor inclosed thereby, of a horn installation built into the radiator and hood, a portion of the horn installation being supported adjacent the motor.

5. In a motor vehicle having a radiator structure, a horn mouth construction incorporated as a part of the original radiator structure, a horn shank secured to the horn mouth construction, and means for connecting the shank to horn operating devices.

6. In a motor vehicle having a radiator structure, a hood, a horn mouth construction incorporated in the original radiator structure, a horn shank secured to the horn mouth construction and extending underneath the hood, and means for connecting the shank to horn operating devices.

7. In a motor vehicle having a radiator, a hood, and a motor underneath the hood, horn mouth construction extending through a portion of the radiator, a horn shank having one end thereof secured to the horn mouth construction, and means on the motor for anchoring the shank underneath the hood.

8. In a motor vehicle having a radiator, a hood, and a motor underneath the hood, a horn mouth construction built into the radiator, a horn shank having one end thereof detachably secured to the horn mouth, and means for anchoring the shank to the motor underneath the hood.

9. In a motor vehicle having a radiator, horn portions having an inwardly extending flange and built into the radiator as a continuous part thereof, and a horn shank connected to the inwardly extending flange.

10. In a motor vehicle having a radiator, and horn portions having inwardly extending flanges built into the radiator, and a horn shank arranged to cooperate with the horn portions, said inwardly extending flanges and horn shank having beaded interfitting connections.

11. In a motor vehicle having a radiator and a hood mounted thereon, horn portions having inwardly extending flanges built into the radiator, and a horn shank detachably connected to the inwardly extending flanges, said hood having portions shaped to cooperate with the horn portions for receiving portions of the horn shank.

12. A radiator for motor vehicles comprising a shell having portions shaped to define a horn mouth, said horn mouth opening forwardly of the radiator and including a flange extending rearwardly, said flange having beaded horn assembling marginal portions for receiving a horn shank.

HENRY HUEBER.
ERWIN C. HORTON.